United States Patent [19]
Roll et al.

[11] 3,916,320

[45] Oct. 28, 1975

[54] LORAN RECEIVER SIGNAL CANCELLER

[75] Inventors: Ronald G. Roll, Silver Spring; Henry H. Elliott, Jr., Bethesda, both of Md.

[73] Assignee: The Johns Hopkins University, Baltimore, Md.

[22] Filed: June 7, 1974

[21] Appl. No.: 477,410

[52] U.S. Cl. .................................. 325/476; 328/165

[51] Int. Cl.² ............................................ H04B 1/12

[58] Field of Search ................................ 325/21–24, 325/473–476, 479; 328/165, 167; 343/5 R, 5 DP, 179, 180

[56] References Cited

UNITED STATES PATENTS

| | | | |
|---|---|---|---|
| 3,537,008 | 10/1970 | Lakatos | 325/474 X |
| 3,544,904 | 12/1970 | Eness | 325/475 |
| 3,628,003 | 12/1971 | Spence | 328/165 X |
| 3,706,933 | 12/1972 | Bidell et al. | 325/479 |

*Primary Examiner*—Benedict V. Safourek
*Attorney, Agent, or Firm*—Robert E. Archibald

[57] ABSTRACT

A signal canceller for use in the RF section of a Loran receiver, for example. Three basic feedback loops, each utilizing a phase comparator, operate with a differential amplifier to effectively cancel an undesired signal. An existing Loran navigation control computer is used with sample and hold devices in each loop to allow accurate and continuous cancelling of an undesired signal in the presence of a desired signal with no degradation of the desired signal and no attendant effect on the cancelling loop signal by the desired signal.

11 Claims, 2 Drawing Figures

LORAN RECEIVER SIGNAL CANCELLER

BACKGROUND OF THE INVENTION

In any wireless system for transmitting and receiving accurate timing or communication information unwanted signals are always a problem. This problem of course affects that class of navigation systems known as Loran. A conventional method for reducing the effects of unwanted signals is to filter the signal, thereby limiting the bandwidth and eliminating a great portion of the undesired signals. While this technique is widely used in Loran systems it does not solve the problem caused by undesired signals of generally the same frequency as the Loran signals. While various automatic feedback loops have been used in the past to reduce undesired signals occuring within the desired signal bandwidth, the feedback signals have also influenced the level of the desired timing pulses. Past systems then have sacrificed a portion of the desired signal in an attempt to eliminate the undesired effects of interference occurring within the desired signal bandwidth.

SUMMARY OF THE PRESENT INVENTION

The present invention provides a three loop system utilizing phase lock feedback and an accurate prediction of the occurrence of the next timing pulse, to provide an effective signal (undesired) canceller. Modern Loran receiver/navigator systems may utilize a computer to provide internal timing signals and to perform the mathematical solutions of the navigation equations. The present invention utilizes the computer to control the operation of the signal canceller. Signal cancelling is optimally performed in the RF section of a Loran receiver, and the illustrated embodiment of the present invention is intended for use in that particular section. It should be understood at this time, however, that the proposed signal canceller may be employed to advantage in applications other than Loran receivers, so long as the incoming signal has a predictable time frame.

The present signal canceller is a phase lock device which operates to attenuate undesired signals within the Loran signal bandwidth. A voltage controlled oscillator is phase locked to the undesired signal then, the oscillator output signal amplitude is adjusted such that when its output signal and the undesired signal are both fed to a differential amplifier the undesired signal is effectively cancelled. The signal canceller consists of three basis feedback loops: a signal phase control loop, a signal amplitude control loop, and an automatic gain control (AGC) loop. The AGC loop serves to improve the performance of the phase control loop. The present signal canceller thus provides apparatus to allow accurate and continuous cancelling of undesired signals, whether they be amplitude or phase modulated, in the presence of a desired signal with no degradation of the desired signal and no attendant effect on the cancelling loop signal by the desired signal. The response of the signal canceller to an undesired phase modulated signal is a function of the phase control loop bandwidth, similarly the signal canceller response to an undesired amplitude modulated signal is determined by the bandwidth of the amplitude control loop. Maintaining the desired signal free from degradation is accomplished by using a sample and hold device in each of the three loops, and RF unit mode file and the Loran receiver/navigator control computer which supplies signals to the sample and hold device a few microseconds before the beginning of the Loran pulse. The sample and hold devices in the sample mode allow the loops to operate so as to adjust to changes of the undesired signal, while in the hold mode the loops are insensitive to any input signal change, and the phase and amplitude of the cancelling signal are not permitted to vary. The RF unit mode file is comprised of shift registers which store computer generated information used to control the sample and hold devices.

It is therefore an object of the present invention to provide apparatus to cancel undesired signals present in a Loran navigation system or the like.

It is a further object to provide a signal canceller which operates in the Loran signal bandwidth but does not effect the Loran timing pulses.

It is another object of the present invention to provide a system for cancelling undesired interference utilizing a computer to control the signal cancelling operation.

DESCRIPTION OF THE PREFERRED EMBODIMENT

Figure 1:
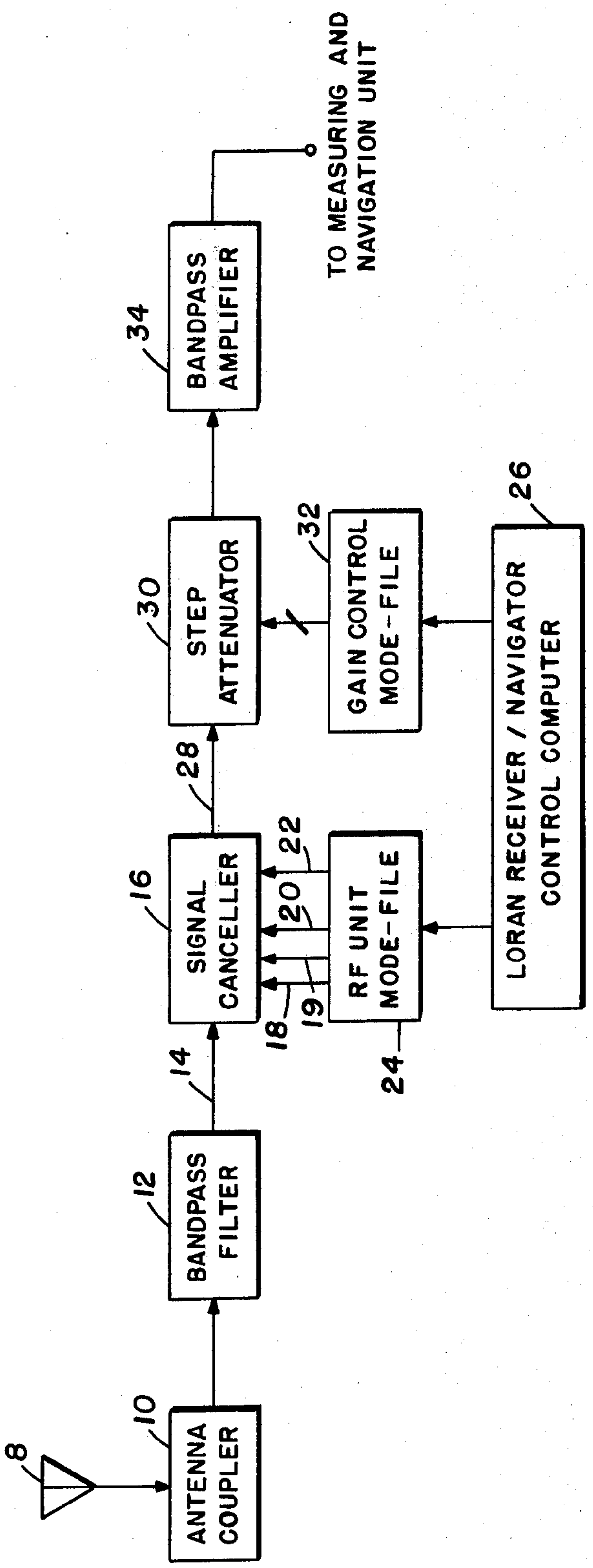
FIG. 1 is a block diagram of the RF of a Loran receiver system incorporating the signal canceller of the present invention.

Referring now to FIG. 1, the RF section of a Loran receiver utilizing the present invention is shown. Loran signals are received by a conventional antenna 8 and fed to an antenna coupler 10 which presents the desired impedance to the antenna and amplifies the received signals which are then fed to a bandpass filter 12. The bandpass filter 12 provides attenuation of undesired signals outside ot the Loran bandwidth, if Loran-C is being used a desirable bandwidth of the bandpass filter 12 is 85kHz to 117kHz. The received signal is now fed on line 14 to the signal canceller 16 of the present invention, which contains 3 feedback loops which are controlled by signals, on lines 18, 19, 20, 22, from an RF unit mode file 24. The RF mode file 24 consists of shift registers and serves to store information generated by the Loran receiver/navigator control computer 26 which controls the time and mode of the signal canceller 16 operation. The timing signals on lines 18, 20, and 22 are internally available in receivers of this type and it is a simple matter for one familiar with Loran receivers to obtain these timing signals. By way of example, the generation of such timing signals are described in detail in an article by R. A. Reilly entitled "Microminiature Loran-C Receiver/Indicator", Institute of Electrical Engineers Transactions on Aerospace and Electronic Systems, Vol. AES-2, No. 1, pp. 74–88 (1966). The received Loran signal is then fed out of the signal canceller 16 on line 28 to a step attenuator unit 30 which consists of a series of incremental attenuators which are under the control of the computer 26. The overall receiver gain is controlled by a gain control mode file 32 which is used to store the computer generated gain control information. The step attenuator 30 may consist of multiple attenuators connected in series with each attenuator being controlled by a signal from the gain control mode file 32. The signal is then fed from the step attenuator 30 through a conventional bandpass amplifier 34 before being fed to the Loran measuring and navigation unit.

Figure 2:
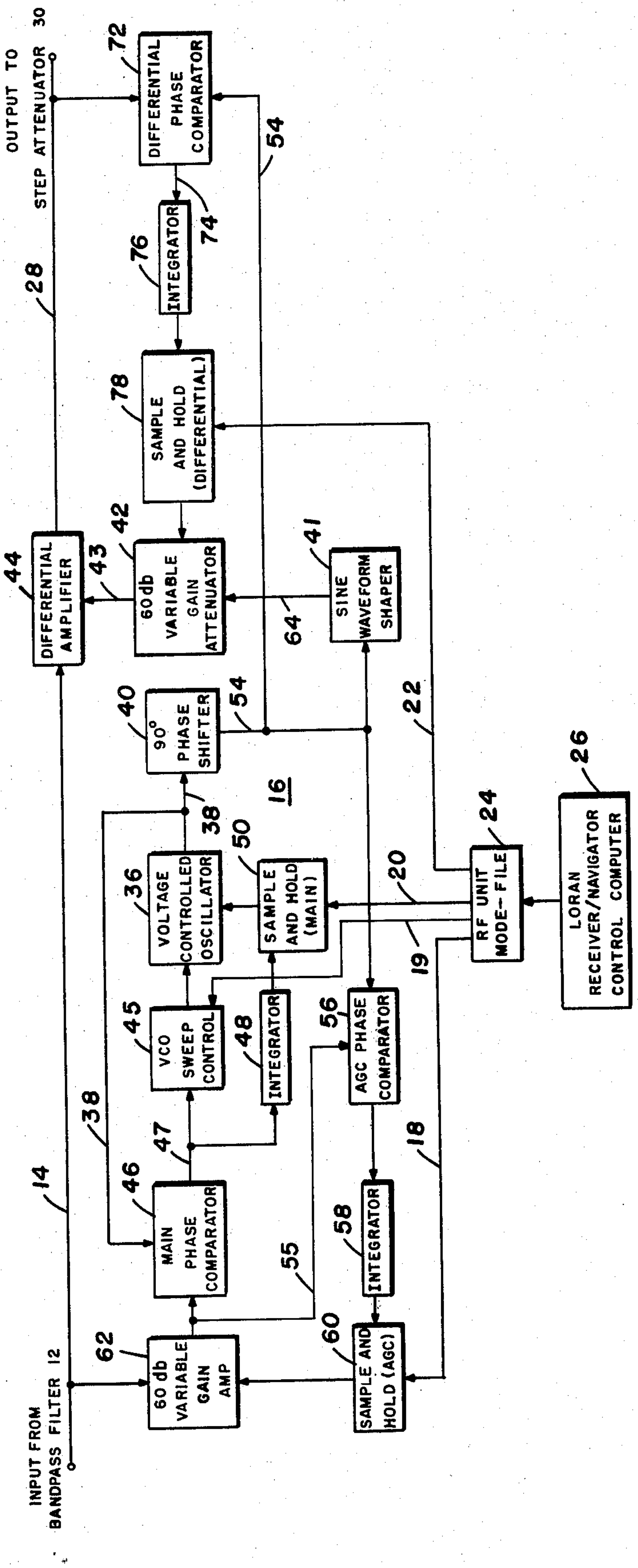
FIG. 2 is a detailed block diagram of one embodiment of the proposed signal canceller as applied to the system of FIG. 1.

Referring now to FIG. 2, the signal canceller 16 of FIG. 1 is shown in more detail. The signal canceller 16 employs a voltage controlled oscillator (VCO) 36 which is phase locked to the undesired signal, then an output signal on line 38 from the voltage controlled oscillator 36 is shifted in phase by a phase shifter 40, shaped by a sine wave shaper 41 and amplitude adjusted by a variable attenuator 42. The output signal on line 43 of the variable attenuator 42 is then differentially amplified in differential amplifier 44 with the undesired input signal on line 14 to produce signal cancellation at the output on line 28. When Loran-C operation is desired, the input to the signal canceller 16 is frequency limited to a 85kHz to 117kHz bandwidth by the bandpass filter 12 of FIG. 1. When an undesired signal occurs within this bandwidth the computer 26 commands the signal canceller 16 to operate by means of a signal appearing on line 19 which energizes a VCO sweep and loop control circuit 45. The voltage controlled oscillator (VCO) sweep and loop control circuit 45 causes the VCO 36 output signal frequency to sweep the 80kHz to 125kHz frequency range. When the VCO frequency on line 38 is coincident with the undesired frequency, a main phase comparator 46 output frequency on line 47 becomes zero. This causes the VCO sweep and loop control circuit 45 to stop the VCO sweep and the VCO 36 to phase lock to the undesired signal. The VCO 36 phase locks to the undesired signal through a main phase comparator 46, integrator 48, and sample and hold unit 50. The integrator 48 sets the loop bandwidth and thereby the response, while the sample and hold unit 50 operates in the sample mode, which is as a simple amplifier, as commanded by the computer 26 through the mode file 24 by a signal on line 20.

Because of the manner of operation of the main phase comparator 46 the VCO 36 output signal on line 38 is 90° out-of-phase from the input signal on line 14. The 90° phase shifter 40 then produces an output signal on line 54 which restores the VCO output signal of line 38 to the input signal phase. The 90° phase shifter output signal on line 54 is applied, as a reference, to the automatic gain control (AGC) phase comparator 56 for comparison against a gain adjusted input signal on line 55. The AGC phase comparator 56, an integrator 58 and a second sample and hold device 60, which is under the control of the RF unit mode file 24 by signals on line 18, and a 60 db variable gain amplifier form a feedback loop which serves to hold the amplitude of the input signal on line 55 to the main phase comparator 46 constant by adjusting the gain of a variable attenuator 62. This is true even though the signal canceller 16 input signal on line 14 may vary over a 60 db range. As is well-known, a constant amplitude is required at the main phase comparator input for proper phase lock loop operation. The integrator 58 serves to set the automatic gain control time constant. Sample and hold device 60 operates in the sample mode as a simple amplifier when commanded by the computer 26 through the RF unit mode file 24 by a signal on line 18.

Since the output signal on line 54 of the 90° phase shifter is triangular in shape, as was indicated earlier, it must be applied to the sine waveform shaper 41. The shaper 41 reduces the harmonic content of the cancelling signal to provide improved signal cancelling. The sine waveform output on line 64 is then applied to the differential amplifier 44 after being passed through the 60 db variable attenuator 42. The second input to the differential amplifier 44 is the signal canceller input signal on line 14. Because the two input signals on line 14 and line 43 to the differential amplifier 44 are in phase and a signal difference is taken in the differential amplifier, the differential amplifier output signal on line 28 is a sine wave of amplitude smaller than the larger of the two input signals. However, the output signal phase may be either in phase or out of phase with the signal canceller input signal on line 14, depending on which of the two differential amplifier input signals (on line 14 or on line 43) is larger.

When the output signal on line 43 from the 60 db variable gain attenuator 42 is larger than the signal canceller input signal on line 14, the differential amplifier 44 output signal on line 28 will be out of phase with the signal canceller input signal on line 14. This out of phase signal is compared with the 90° phase shifter 40 output signal on line 54 in a differential phase comparator 72 which will produce a negative signal on line 74. This negative signal on line 74 is also applied to the 60 db variable gain attenuator 42 through an integrator 76 and a third sample and hold device 78, and serves to reduce the 60 db variable attenuator 42 output signal on line 43. When the 60 db variable attenuator 42 output signal on line 43 is reduced in amplitude to that of the signal canceller input signal on line 14, the differential amplifier 44 output signal amplitude on line 28 approaches zero, and no further correction to the 60 db variable gain attenuator 42 control is made. The integrator 76 controls the reaction time in this amplitude control loop and the third sample and hold device 78 operates in the sample mode again as a simple amplifier when commanded by the computer 26 through the RF unit mode file 24 by a signal on line 22. When the two signals on line 14 and on line 43 which are applied to the differential amplifier 44 are equal in phase and amplitude, the differential amplifier output signal on line 28, which forms the signal canceller 16 output, is zero and the undesired signal canceller input signal is cancelled. In practice, the output signal on line 28 can only approach zero as some error must exist in the phase loop and amplitude loop operations.

In the above description the operation of the signal canceller 16 has only been discussed with regard to a single undesired signal. In actual use, however, the signal canceller must operate in the presence of the desired Loran signal which could influence the cancelling action on the undesired signal. Therefore, the signal canceller operating mode is changed during the Loran pulse reception time. A description of this mode of operation is given below.

In a modern computer controlled Loran receiver/navigator, after the Loran signal has been fully acquired, a computer control signal will be available to command the signal canceller 16 to ignore any further input signals, including Loran-C pulse reception. That is, assume that the signal canceller 16 is phase-locked to the undesired signal and cancellation has occurred. When a Loran pulse is received, the main phase comparator 46 and the differential phase comparator 72 output signals could include some of the Loran-C signal, thereby causing disturbance of the phase and amplitude loops and a reduction of the amount of undesired signal cancellation. In order to prevent a reduction of undesired signal cancellation all sample and hold circuits, main sample and hold device 50 automatic gain control sample and hold device 60, and differential sample and hold device 78 are commanded by the computer 26 through the RF mode file 24 by signals on lines 18, 20, 22, to the hold mode a few microseconds before the beginning of the Loran pulse. These timing signals on lines 18, 20, 22 are available in the computer 26 or, if more convenient, are obtainable from the navigational information section of the typical Loran receiver/navigator. Therefore, the 60 db variable attenuator 42 output signal on line 43 is held at the same phase and amplitude as observed at the end of the sample mode and cancellation of the undesired signal is maintained. When the Loran pulse has ended, the sample and hold circuits 50, 60 and 78 are commanded back to the sample mode, and any errors that may have accumulated in the phase or amplitude loops are then corrected.

It is understood that the details of the foregoing embodiment are set forth by way of example only. Accordingly, it is contemplated that this invention not be limited by the particular details of said embodiment except as defined in the appended claims.

What is claimed is:

1. A signal canceller for removing an undesired signal from a received composite signal containing said undesired signals and pulses of a known rate of occurrence, said signal canceller being responsive to apparatus which demarcates when a pulse is and is not occurring within said composite signal and comprising:

first circuit means responsive to said composite signal and said pulse demarcating apparatus and rendered effective when a pulse is not occurring in said composite signal for producing a signal whose phase and frequency correspond continuously to the phase and frequency of said undesired signal within said composite signal, said first circuit means including holding means capable when rendered effective for holding constant the phase and frequency of said produced signal, comparator means responsive to said composite signal and said signal produced by said first circuit means for producing a difference signal representing the difference in amplitudes of said composite signal and said signal produced by said first circuit means, and second circuit means responsive to said difference signal and said pulse demarcating apparatus and rendered effective when a pulse is not occurring in said composite signal for adjusting the amplitude of said signal produced by said first circuit means to equal the amplitude of the composite signal, said second circuit means including holding means capable when rendered effective for holding constant the amplitude of said produced signal, said holding means of said first and second circuit means being rendered effective each time a pulse occurs within said composite signal for holding constant during each pulse the amplitude, phase and frequency of said signal produced by said first circuit means.

2. The apparatus of claim 1 further comprising:

third circuit means responsive to said signal produced by said first circuit means for producing a signal to hold said signal produced by said first circuit at a constant level, and means operably connected to said third circuit means and rendered effective each time a pulse occurs within said composite signal for holding constant during each pulse the amplitude of said signal produced by said third circuit means.

3. The apparatus of claim 1 wherein said first circuit means comprises a phase lock loop circuit.

4. The apparatus of claim 3 wherein said phase lock loop comprises:

phase comparator means having a first input connected to receive said composite signal and a second input connected to receive a feedback signal for producing a phase difference signal representing the difference in phase between said composite signal and said feedback signal, integrator means connected to receive said phase difference signal from said phase comparator means for producing an integrated output signal therefrom, and voltage controlled oscillator means connected to receive said integrated signal for producing said feedback signal having a frequency proportional to the amplitude of said integrated output signal.

5. The apparatus of claim 1 wherein said comparator means comprises a differential amplifier.

6. The apparatus of claim 2 wherein said means operably connected to said first and second circuit means and said means operably connected to said third circuit means comprise sample and hold devices.

7. The apparatus of claim 6 wherein said second circuit means comprises an amplitude control loop including second phase comparator means having a first input connected to receive said difference signal and a second input connected to receive said signal from said first circuit means for producing a signal representing the difference in phase of said difference signal and said signal from said first circuit means, integrator means connected to receive said phase difference signal from said phase comparator means for producing an integrated output signal therefrom, and variable gain attenuator means having a first input connected to receive said signal produced by said first circuit means and a second input connected to receive said integrated output signal for adjusting the amplitude of said signal produced by said first circuit means.

8. The apparatus of claim 7 wherein said third circuit means comprises an automatic gain control loop including:

second variable attenuator means having a first input connected to receive said composite signal and a second input connected to receive a feedback signal for producing an output signal representing said composite signal having an amplitude controlled by said feedback signal, third phase comparator means having a first input connected to receive said output signal from said second variable attenuator means and a second input connected to receive said signal from said first circuit means for producing an output signal representing the difference in phase of said output signal from said second variable attenuator and said signal from said first circuit means, and integrator connected to receive said output signal from said third phase comparator for integrating said output signal from said third phase comparator and producing said feedback signal signal connected to said second variable attenuator means.

9. A method of cancelling an undesired signal from a received composite signal containing said undesired signal and pulses of a known rate of occurrence, said method being responsive to apparatus which demarcates when a pulse is and is not occurring within said composite signal and comprising the steps of:

producing a first signal which can lock-onto and follow the phase and frequency of the undesired signal, taking the difference between the composite signal and the produced first signal to produce a second signal free of the undesired signal, producing a third signal having an amplitude dependent upon the phase of the second signal, combining the third signal and the first signal in a variable gain amplifier to increase or decrease the level of the first signal, and controlling by said pulse demarcating apparatus the production of said first and third signals to permit said first and third signals to be adaptive to changes in the composite signal in the time between the pulses of known rate and prohibiting the first and third signals from being adaptive to changes in the composite signal during the time of occurrence of the pulses of known rate.

10. The method of claim 9 comprising the further step of:

maintaining at a constant amplitude the first signal produced.

11. The method of claim 10 wherein the step of producing a first signal comprises the steps of:

comparing the phase of the composite signal to the phase of feedback signal and producing a phase difference output signal, integrating the phase difference output signal and producing an integrated output signal, and producing the feedback signal having a frequency proportional to the integrated output signal.

* * * * *

UNITED STATES PATENT OFFICE
CERTIFICATE OF CORRECTION

Patent No. 3,916,320 Dated October 25, 1975

Inventor(s) Ronald G. Roll et al.

It is certified that error appears in the above-identified patent and that said Letters Patent are hereby corrected as shown below:

Column 1, immediately following the title of the invention, the following paragraph should be added:

-- The invention described herein was made in the course of work under a contract with the Department of the Navy --.

Signed and Sealed this

*eighth* Day of *June 1976*

[SEAL]

*Attest:*

RUTH C. MASON
*Attesting Officer*

C. MARSHALL DANN
*Commissioner of Patents and Trademarks*